United States Patent
Elliott et al.

(10) Patent No.: US 8,608,981 B2
(45) Date of Patent: Dec. 17, 2013

(54) METHODS FOR SULFATE REMOVAL IN LIQUID-PHASE CATALYTIC HYDROTHERMAL GASIFICATION OF BIOMASS

(75) Inventors: Douglas C. Elliott, Richland, WA (US); James Oyler, Salt Lake City, UT (US)

(73) Assignees: Battelle Memorial Institute, Richland, WA (US); Genifuel Corporation, Salt Lake City, UT (US)

( * ) Notice: Subject to any disclaimer, the term of this patent is extended or adjusted under 35 U.S.C. 154(b) by 10 days.

(21) Appl. No.: 13/541,003

(22) Filed: Jul. 3, 2012

(65) Prior Publication Data

US 2012/0280180 A1 Nov. 8, 2012

Related U.S. Application Data

(63) Continuation-in-part of application No. 12/339,876, filed on Dec. 19, 2008, now Pat. No. 8,241,605.

(60) Provisional application No. 61/024,970, filed on Jan. 31, 2008.

(51) Int. Cl.
*C01B 3/38* (2006.01)
*C01B 3/24* (2006.01)

(52) U.S. Cl.
USPC .......................................... 252/373; 423/650

(58) Field of Classification Search
USPC ........................................................ 252/373
See application file for complete search history.

(56) References Cited

U.S. PATENT DOCUMENTS

| | | | |
|---|---|---|---|
| 2006/0265954 A1* | 11/2006 | Dogru et al. | 48/197 R |
| 2007/0000177 A1 | 1/2007 | Hippo et al. | |
| 2009/0126274 A1* | 5/2009 | Vogel et al. | 48/127.7 |

* cited by examiner

*Primary Examiner* — Melvin C Mayes
*Assistant Examiner* — Kenneth Vaden
(74) *Attorney, Agent, or Firm* — Klarquist Sparkman, LLP

(57) ABSTRACT

Processing of wet biomass feedstock by liquid-phase catalytic hydrothermal gasification must address catalyst fouling and poisoning. One solution can involve heating the wet biomass with a heating unit to a pre-treatment temperature sufficient for organic constituents in the feedstock to decompose, for precipitates of inorganic wastes to form, for preheating the wet feedstock in preparation for subsequent removal of soluble sulfate contaminants, or combinations thereof. Processing further includes reacting the soluble sulfate contaminants with cations present in the feedstock material to yield a sulfate-containing precipitate and separating the inorganic precipitates and/or the sulfate-containing precipitates out of the wet feedstock. Having removed much of the inorganic wastes and the sulfate contaminants that can cause poisoning and fouling, the wet biomass feedstock can be exposed to the heterogeneous catalyst for gasification.

20 Claims, 2 Drawing Sheets

METHODS FOR SULFATE REMOVAL IN LIQUID-PHASE CATALYTIC HYDROTHERMAL GASIFICATION OF BIOMASS

CROSS-REFERENCE TO RELATED APPLICATIONS

This invention claims priority from, and is a continuation-in-part of U.S. patent application Ser. No. 12/339,876 filed Dec. 19, 2008, now U.S. Pat. No. 8,241,605, which claims priority from U.S. Provisional Patent Application 61/024,970 filed Jan. 31, 2008. Both applications are incorporated herein by reference.

STATEMENT REGARDING FEDERALLY SPONSORED RESEARCH OR DEVELOPMENT

This invention was made with Government support under Contract DE-AC0576RL01830 awarded by the U.S. Department of Energy. The Government has certain rights in the invention.

BACKGROUND

Conventional ways of gasifying of biomass can utilize thermal methods involving pyrolysis and/or partial oxidation to produce a fuel gas or a synthesis gas composed of carbon oxides and hydrogen. Many of the known methods use a dry biomass feedstock with less than 10 wt % moisture. However, much of the biomass resource that is actually available contains significantly higher levels of moisture, typically 50 wt %. Some biomass even consists of "wet" biomass, or biomass in water slurries at 85 wt % moisture or higher. One approach to efficiently process such wet biomass is gasification employing an active catalyst in a pressurized water environment (e.g., hydrothermal gasification).

However, hydrothermal gasification involving critical, or above critical operating conditions are expensive. Furthermore, when treating wet biomass by hydrothermal gasification, constituents that are commonly inherent in the feedstock can poison and/or foul the catalyst making long-term and/or continuous operation difficult to achieve. Accordingly, a need for improved methods for liquid-phase hydrothermal gasification of wet biomass exists.

SUMMARY

This document describes methods for treating wet biomass by liquid-phase catalytic hydrothermal gasification that address the problem of poisoning and fouling of the catalyst, especially by sulfate contaminants that are soluble in the liquid portion of the wet biomass feedstock. The methods involve operations at temperatures and pressures that maintain the wet biomass feedstock in the liquid phase without forming a critical or supercritical fluid. The wet biomass feedstock comprises solid and/or soluble biomass, soluble sulfate contaminants, and sub-critical liquid water. Some biomass feedstocks can also comprise inorganic wastes that can cause plugging and poisoning of the catalyst. These sulfate contaminants and inorganic wastes can be precipitated out before gasification by heating the wet biomass feedstock prior to exposure to the catalyst according to embodiments of the present invention.

Referring to FIG. 1, treatment of the wet biomass feedstock comprises heating 100 the wet biomass with a heating unit to a pre-treatment temperature sufficient for organic constituents in the feedstock to decompose, for precipitates of inorganic wastes to form, for preheating the wet feedstock in preparation for removal of the soluble sulfate contaminants, or combinations thereof. The process further comprises reacting 101 the soluble sulfate with cations present in the feedstock in order to yield sulfate-containing precipitates and separating 102 the precipitates of inorganic wastes and the sulfate-containing precipitates out the wet biomass feedstock. After processing, the liquid of the wet biomass feedstock can have a decreased sulfate content. For example, accounting for the soluble sulfate and/or sulfate in the sulfate-containing precipitates, the feedstock can have less than 20 ppm sulfate content. Having removed much of the inorganic wastes and the soluble sulfate contaminants that can cause poisoning and fouling, the wet biomass feedstock can be exposed to the heterogeneous metal catalyst for gasification 103.

As used herein, biomass refers to biological material that can be used for fuel or for industrial production. Exemplary biomass can include, but is not limited to, biosludge from wastewater treatment facilities, sewage sludge from municipal treatment systems, wet byproducts from biorefinery operations, wet byproducts/residues from food processing, animal waste and waste from centralized animal raising facilities. As used herein, biomass can also refer to various organic wastes. Examples include, but are not limited to organic chemical manufacturing wastewater streams, and industrial wastewater containing organics. Biomass commonly comprises organic matter that can be treated in a continuous reactor, according to embodiments of the present invention, to yield a gas containing hydrogen or useful for hydrogen production (e.g., methane). Common inorganic contaminants, which can poison and/or foul the catalyst, can include, but are not limited to minerals comprising Ca, Mg, P, and/or Fe. Sulfur-containing contaminants can occur in two different forms, reduced and oxidized. The reduced sulfur contaminants can occur in protein structures. The oxidized sulfur contaminants can occur as soluble sulfate contaminants. The sulfate contaminants can arise, for example, from oxidation of protein structures.

In some embodiments, the biomass can further comprise at least a partial source of the cations that react with the soluble sulfate contaminants to yield sulfate-containing precipitates. For example, the biomass can comprise certain compounds that yield cations in the feedstock at processing conditions. Alternatively, or in addition, the cations can be provided by adding 104 a salt to the feedstock. Examples of cations can include, but are not limited to, barium and calcium. In some embodiments, the salt added to the feedstock can be substantially water-soluble. An example of a water-soluble salt comprising calcium can include, but is not limited to, calcium ascorbate. Alternatively, the salt can be only partially water-soluble. Examples of calcium salts can include, but are not limited to, calcium oxide, calcium hydroxide, and calcium carbonate.

In preferred embodiments, the heterogeneous catalysts comprise Ru, Ni, and/or Ni with added Na. The Na can be in the form of a sodium carbonate co-catalyst. In a particular embodiment, the catalyst comprises Ru on a carbon support. Furthermore, the catalyst can be configured to gasify the organic constituents into a hydrogen-containing feedstock for subsequent catalytic reformation.

Separation of solids, including the sulfate-containing precipitates, from the heated wet biomass feedstock can be achieved using a solids separation unit, which can include, but is not limited to, a gravity separation unit, a hydrocyclonic separation unit, and/or a filtration unit. Removal of reduced sulfur can be achieved using a sulfur separation unit comprising, for example, an adsorbent bed with a metal or metal oxide.

Embodiments of the catalytic hydrothermal process occur at conditions in which water is below its critical point (i.e., sub-critical) and remains in the liquid phase. In a preferred embodiment, the wet biomass feedstock is heated to a pre-treatment temperature of at least 300° C. In another embodiment, a catalytic reactor containing the heterogeneous catalyst is heated to a temperature between 250° C. and 374° C. The pressure in the catalytic reactor can be up to 23 MPa without transitioning into a critical or supercritical fluid. In a preferred embodiment the catalytic reactor is operated at temperatures between 340° C. and 360° C. and pressures between 18 MPa and 21 MPa. It is important to note that while standard values for the critical temperature and pressure of water are provided herein, effective values can vary. For example, the standard critical temperature of water can be depressed as a result of some physical effects including the presence of dissolved species. Accordingly, as used herein, sub-critical liquid refers to the liquid of the feedstock that is below the effective critical point and not just below the standard critical point of water.

Unexpectedly, the solubility of the sulfate-containing precipitate is low enough at the operating conditions described herein for hydrothermal gasification (i.e., at elevated temperatures) that the cations can facilitate removal of the otherwise soluble sulfate contaminants by reaction to form precipitates. Previously, it had been assumed that compounds, which result from reactions between the soluble sulfate contaminants and the cations, were too soluble to be useful in removing soluble sulfate contaminants. In other words, a surprising result was that the cations and the soluble sulfate contaminants were soluble in the feedstock at conventional temperatures and pressures (i.e. as received from waste streams), but reacted to form insoluble precipitates at elevated temperatures (i.e., the pre-treatment temperatures and/or hydrothermal gasification temperatures). This change in solubility facilitates removal of the sulfate contaminants from the feedstock prior to gasification.

In a preferred embodiment, wherein the wet biomass feedstock also comprises soluble, reduced-sulfur contaminants, the process further comprises capturing the soluble, reduced sulfur contaminants in an adsorbent bed by reaction with a metal or a metal oxide.

This document also describes an embodiment encompassing a catalytic hydrothermal process for treating a wet biomass feedstock comprising biomass, inorganic contaminants, soluble sulfate contaminants, and sub-critical liquid water. The process operates at temperatures and pressures that maintain the wet biomass feedstock in liquid phase without forming a supercritical fluid and is characterized by adding a salt comprising a calcium cation to the feedstock. The process further comprises heating under pressure the wet biomass feedstock to a pre-treatment temperature, which is at least 300° C. and is sufficient for organic constituents in the feedstock to decompose, for precipitates of inorganic wastes to form, and for preheating the wet feedstock in preparation for removal of the soluble sulfate contaminants and reacting the soluble sulfate contaminants with calcium cations from the salt to yield a sulfate-containing precipitate. The precipitates of inorganic wastes and the sulfate-containing precipitates are separated out the wet biomass feedstock to yield a liquid of the wet biomass feedstock having a decreased sulfate content, which can then be gasified.

The purpose of the foregoing summary is to enable the United States Patent and Trademark Office and the public generally, especially the scientists, engineers, and practitioners in the art who are not familiar with patent or legal terms or phraseology, to determine quickly from a cursory inspection the nature and essence of the technical disclosure of the application. The summary is neither intended to define the invention of the application, which is measured by the claims, nor is it intended to be limiting as to the scope of the invention in any way.

Various advantages and novel features of the present invention are described herein and will become further readily apparent to those skilled in this art from the following detailed description. In the preceding and following descriptions, the various embodiments, including the preferred embodiments, have been shown and described. Included herein is a description of the best mode contemplated for carrying out the invention. As will be realized, the invention is capable of modification in various respects without departing from the invention. Accordingly, the drawings and description of the preferred embodiments set forth hereafter are to be regarded as illustrative in nature, and not as restrictive.

DESCRIPTION OF DRAWINGS

Embodiments of the invention are described below with reference to the following accompanying drawings.

DETAILED DESCRIPTION

Figure 1:
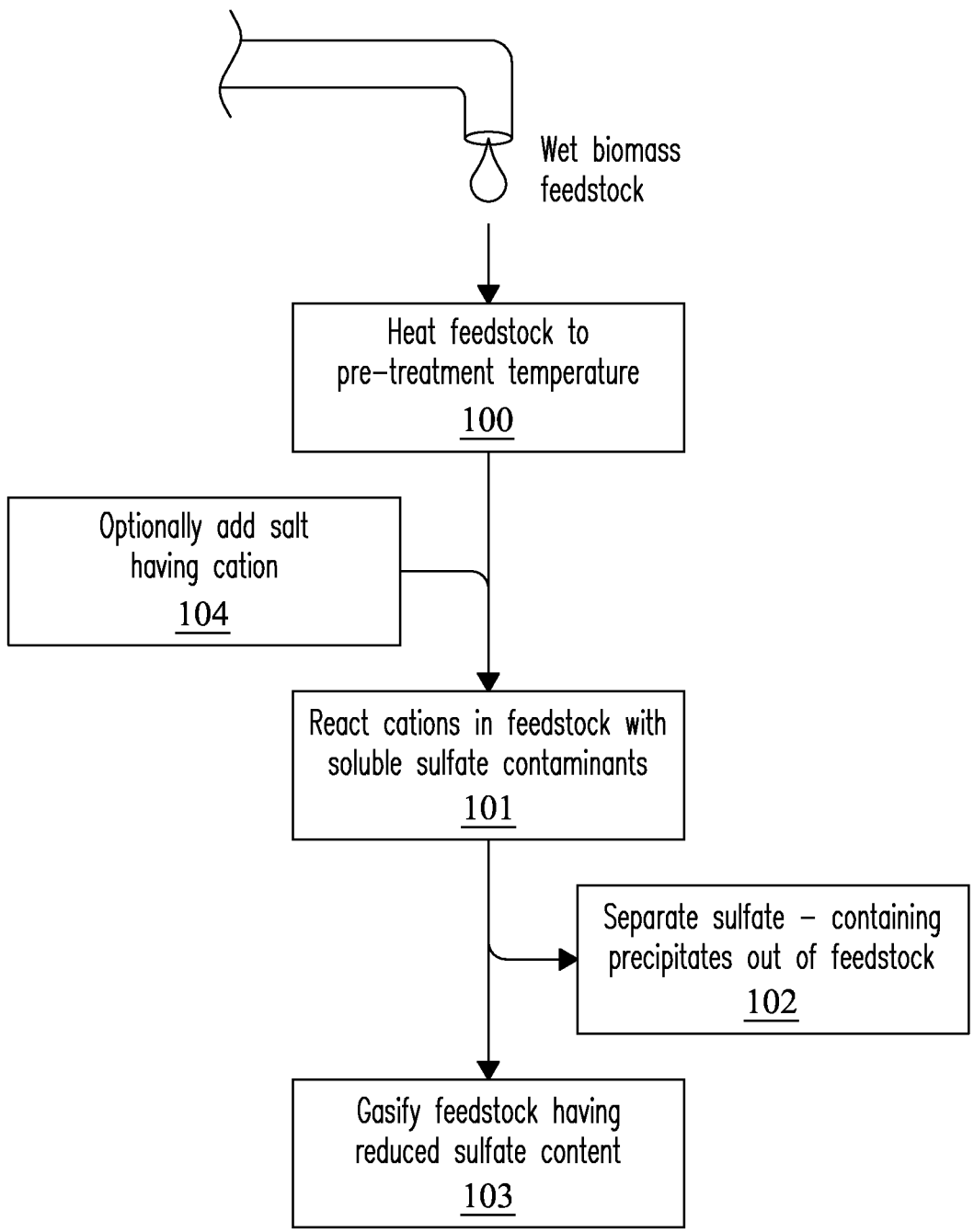
FIG. 1 is a block diagram depicting removal of soluble sulfate contaminants according to embodiments of the present invention.

The following description includes the best mode of one embodiment of the present invention. It will be clear from this description of the invention that the invention is not limited to these illustrated embodiments, but that the invention also includes a variety of modifications and embodiments thereto. Therefore the present description should be seen as illustrative and not limiting. While the invention is susceptible of various modifications and alternative constructions, it should be understood, that there is no intention to limit the invention to the specific form disclosed, but, on the contrary, the invention is to cover all modifications, alternative constructions, and equivalents falling within the spirit and scope of the invention as defined in the claims.

The wet biomass feedstock typically comprises at least two types of solids that can clog, plug, and/or poison the catalyst—organic matter and mineral materials. According to embodiments of the present invention, proper preheating of the biomass feedstock can transform the solid organic matter to liquid and/or gas, both of which can pass into the catalytic reactor without causing plugging and/or poisoning. Furthermore, there is little solid char formation. In the prior art, char can be a major product at lower temperature (<300 C), sub-critical conditions. The present invention also calls for sub-critical liquid-phase operating conditions and provides approaches for the minerals to be precipitated and separated from the liquid stream while allowing the liquefied biomass organics to pass on to the catalytic reactor. With the solids separated, a sulfur scrubber bed could also be used without plugging, as well as the catalytic bed for gasification.

Initial continuous flow experiments of hydrothermal gasification of biomass utilizing nickel catalysts in a Carberry-type stirred tank reactor confirmed that high conversion of biomass solids to gas can be achieved with high concentrations of methane in the product gas using a number of wet biomass feedstocks, such as sorghum, spent grain and cheese whey. However, also seen in these tests was the rapid deactivation of the nickel catalysts. Decomposition of the nickel catalyst and poisoning by mineral content, reduced-sulfur contaminants, and/or soluble sulfate contaminants in the feedstocks were suspected deactivation mechanisms.

Additional testing was performed in a tubular reactor with a fixed bed of catalyst. In the test, brewer's spent grain biomass (28,500-41,000 ppm COD) was processed. A more stable nickel catalyst was used and was effective (97.7% COD reduction @2.3 LHSV) but lost activity (71.2% COD reduction @2.0 LHSV) after several hours. Analysis of the catalyst showed deposits of biomass-derived minerals on the catalyst such as hydroxylapatite ($Ca_5(PO_4)_3OH$) and nickel subsulfide ($Ni_3S_2$).

In a related test, a stirred tank preheater was placed upstream of the tubular catalytic reactor. In this test, using a more concentrated stream of spent grain (61,500-65,000 ppm COD), a less definitive deactivation (initially 96.2% @1.3 LHSV reduced to 82.2% @1.7 LHSV) was noted. Following the test, in addition to catalyst coating, there was also a deposit in the preheater composed of hydroxylapatite and nickel subsulfide, but also iron phosphate, ammonium iron sulfate, potassium aluminosilicate, calcium carbonate, calcium magnesium sulfate, and anorthoclase, an alkali silicoaluminate. All of these precipitates were attributed to components in the biomass feedstock. Furthermore, in tubular-reactor-only configurations, biomass slurry pumping difficulties became evident. Processing of slurries of ground potato or apple peels were short-lived because of pump failures and plugging of solids at the front end of the catalytic bed. The plugging appeared to be primarily organic solids produced from partially pyrolyzed biomass. These short-lived tests verified the high activity (95.4% COD reduction @2.67 LHSV) of the ruthenium stabilized nickel catalyst for biomass gasification.

With the use of a stirred tank preheater, the initial pyrolysis of biomass solids was achieved and effective gasification could be demonstrated at the bench-scale and in a scaled-up engineering demonstration unit. In a scaled-up reactor, the use of either a stirred tank preheater or a tube-in-tube heat exchanger was sufficient to liquefy the biomass solids prior to entering the catalyst bed. However, mineral precipitates from the biomass remained as a significant problem leading to plugging at the front end of the catalyst bed. Deposits composed of magnesium, phosphorus, and calcium were observed. An additional catalyst deactivation problem was also clearly identified by x-ray photometric spectrometry analysis showing sulfur highly associated with the metal in the catalyst.

The results of the tests described above indicate that organic solids, which are a source of plugging in the catalyst bed can be liquefied and/or eliminated by heating the feedstock. Unexpectedly, heating of the feedstock can also concurrently cause precipitation of inorganic material that might otherwise deactivate the catalyst by plugging and/or poisoning.

Figure 2:
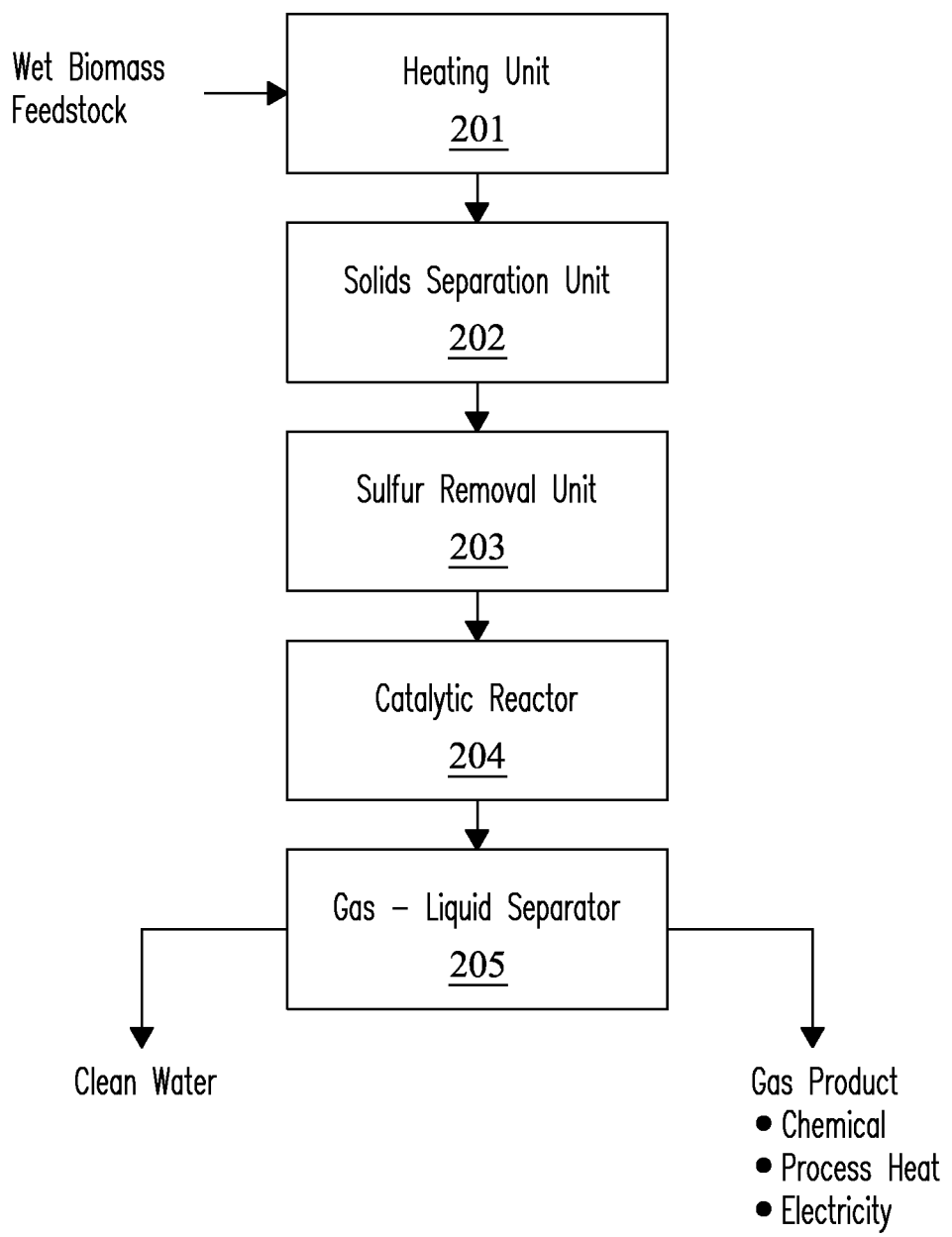
FIG. 2 is a diagram depicting system for hydrothermal gasification of biomass according to one embodiment of the present invention.

The problem of mineral and organic deposits when processing biomass can be addressed through heating the feedstock and capturing inorganic solids according to embodiments of the present invention. Referring to FIG. 2, one such embodiment is depicted in which a continuous-flow reactor system comprises a wet biomass feedstock heater 201, a sulfur removal unit 203, a solids separation unit 202, a catalytic reactor 204, and a gas-liquid separator 205.

One particular system similar to the one illustrated in FIG. 2 was based on a throughput of 0.5-10 lb of slurry or solution per hour and was typically operated over a range of 1 to 3 liter/hour. These operating parameters are not to be construed as limitations to the present invention, but are rather descriptive by way of example. Slurry feeding to the pressurized system was accomplished using a syringe pump having a large-bore valve package that controls the feeding from one cylinder or the other. The valve package comprised four ⅜-inch air-actuated (6000 psi rated) ball valves with ⅜-inch stainless steel (SS) tubing connections. Oversize caps were installed on the barrels that accommodate ⅜-inch NPT fittings. The large bore head, valve, and tubing allowed suctioning and pumping of the viscous slurries while still allowing the pump to operate at 3500 psi max. All valves and valve trim (except the pressure-control valve) were made of SS. The feeding rates were measured directly by the screw drive of the positive displacement syringe pump.

The preheater was a 1-liter 316 SS vessel that functioned as a continuous-flow, stirred-tank reactor in which the feedstock was brought to the reaction temperature. In the process of heat up, the organics in the biomass were pyrolyzed and liquefied while inorganic components, such as calcium phosphates, formed and precipitated as solids. Furthermore, as described elsewhere herein, cations present in the feedstock can react with the soluble sulfate contaminants to form sulfate-containing precipitates, which can be removed to ultimately reduce the content of sulfate contaminants in the feedstock.

The catalytic reactor was constructed of 304 SS and had an inner diameter of one inch with a length of 72 inches. The reactor had bolted-closure endcaps with metal o-rings on each end. Catalyst pellets were supported in the reactor on a circle of fine screen. The reactor furnace was a 6-k We resistance heater split into three separately controllable zones. The pressure was controlled with a dome-loaded diaphragm back-pressure regulator.

A solid separations unit was placed in the process line between the preheater and the reactor to capture and remove the solids before they reached the catalyst bed, where, in previous tests, they have collected and caused flow plugging. These solids can comprise precipitates of the inorganic contaminants and/or the sulfate-containing precipitates.

A sulfur scrubber trap incorporating a chemical trap for reduced sulfur forms was also used. The reduced sulfur components reacted with the trap material to form insoluble sulfide, which prevented their passing into the catalyst bed where they could react with the metal of the catalyst and destroy its catalytic capability.

Using the continuous-flow reactor system described above, tests were completed with stillage from corn ethanol production and with insoluble solids following starch extraction from wheat millfeed (wheat flour byproduct). A run of at least 10 hours was completed with the stillage and ended when the feedstock was exhausted. The liquid hourly space velocity was 1.5 L/L/hr and the conversion of chemical oxygen demand (COD) was 99.7 to 99.9% throughout the test. Gas yield was 0.84 L/g dry solids with a composition of 57% methane, 41% carbon dioxide and 2% hydrogen. Other hydrocarbon gas products amounted to less than 1% and the carbon monoxide was undetectable at less than 100 ppm. The mineral recovery system recovered a solid with 91% ash content and which accounted for less than 1% of the carbon in the feedstock. Phosphate in the feedstock at about 2700 ppm was found to be absent, <1 ppm, following the processing.

A 9.5-hour run was completed with the solids from wheat millfeed which had the starch extracted from it. The test was ended when the catalyst was showing significant deactivation. The liquid hourly space velocity was 1.5 L/L/hr and the conversion of COD was 99.9% through most of the test. Gas yield was 0.80 L/g dry solids with a composition of 56% methane, 42% carbon dioxide and 2% hydrogen. Other hydrocarbon gas products amounted to less than 1% and the carbon monoxide was undetectable at less than 100 ppm. The mineral recovery system recovered a solid with 70 to 80% ash content and which accounted for 1 to 2% of the carbon in the feedstock. Phosphate in the feedstock at about 940 ppm was found to be absent, <1 ppm, following the processing. Sulfate was also present in the feed at 35 ppm but was found in the range of 2 to 10 ppm in the effluent.

In a separate experiment, a feed comprising sulfate and a feed comprising sulfate along with calcium ascorbate as a calcium material were compared to specifically determine the effectiveness of reducing sulfate contaminants from a wet biomass feedstock. Using a similar bench-scale reactor system the solutions of sodium sulfate and calcium ascorbate were brought to 350 C in a stirred tank reactor and the solid precipitate (calcium sulfate) separated by settling in a subsequent vessel. Referring to Table 1, the sulfate content in the remaining liquid solution was monitored as a function of time. At 240 minutes the source was switched to the feed comprising calcium ascorbate. 3.5 hours after initiation of the feed having calcium cations, the sulfate content drops from a value greater than 300 ppm to a value of about 20 ppm.

TABLE 1

A summary of sulfate content in a feedstock with and without calcium ascorbate providing Ca cations.

| Source | Time (min) | Sulfate Content (ppm) |
|---|---|---|
| Feed | 0 | 263.3 |
| | 30 | 172 |
| | 60 | 239.2 |
| | 120 | 289.4 |
| | 150 | 294.4 |
| | 180 | 303.8 |
| Feed + Ca-Ascorbate | 240 | 307.7 |
| | 270 | 310.5 |
| | 300 | 150.8 |
| | 330 | 150.4 |
| | 360 | 89 |
| | 390 | 39.2 |
| | 420 | 37.3 |
| | 450 | 22 |

In some instances, cations are present in the feedstock without having added a salt. In such cases, salt addition may not be needed because there are sufficient cations present such that a stoichiometric amount can react with the soluble sulfate contaminants and form insoluble sulfate precipitates. If there is an insufficient amount of cations, then a salt can be added to the feedstock.

While a number of embodiments of the present invention have been shown and described, it will be apparent to those skilled in the art that many changes and modifications may be made without departing from the invention in its broader aspects. The appended claims, therefore, are intended to cover all such changes and modifications as they fall within the true spirit and scope of the invention.

We claim:

1. A catalytic hydrothermal process for treating a wet biomass feedstock comprising biomass, inorganic contaminants, soluble sulfate contaminants, and sub-critical liquid water, the process operated at temperatures and pressures that maintain the wet biomass feedstock in liquid phase without forming a supercritical fluid and characterized by:

heating under pressure the wet biomass feedstock to a pre-treatment temperature sufficient for organic constituents in the feedstock to decompose, for precipitates of inorganic wastes to form, and for preheating the wet feedstock in preparation for removal of the soluble sulfate contaminants;

reacting the soluble sulfate contaminants with cations present in the feedstock to yield a sulfate-containing precipitate;

separating the precipitates of inorganic wastes and the sulfate-containing precipitates out the wet biomass feedstock to yield a liquid of the wet biomass feedstock having a decreased sulfate content; and exposing the liquid of the wet biomass feedstock to a heterogeneous metal catalyst and gasifying at least a portion of the organic constituents after said separating.

2. The process of claim 1, wherein the biomass comprises the cations.

3. The process of claim 1, further comprising adding cations to the feedstock as a salt.

4. The process of claim 3, wherein the salt comprises a compound selected from the group consisting of calcium oxide, calcium hydroxide, calcium carbonate, and combinations thereof.

5. The process of claim 3, wherein the salt is substantially soluble at temperatures below the pre-treatment temperature.

6. The process of claim 5, wherein the salt comprises calcium ascorbate.

7. The process of claim 1, wherein the cation is calcium.

8. The process of claim 1, wherein the cation is barium.

9. The process of claim 1, wherein the decreased sulfate content is less than 20 ppm.

10. The process of claim 1, wherein the pre-treatment temperature is at least 300° C.

11. The process of claim 1, wherein the heterogeneous metal catalyst comprises Ru, Ni, or Ni with added Na.

12. The process of claim 1, wherein the heterogeneous catalyst comprises Ru on a carbon support.

13. The process of claim 1, wherein the wet biomass feedstock further comprises soluble, reduced sulfur contaminants and wherein the process further comprises capturing the soluble, reduced sulfur contaminants in an adsorbent bed by reaction with a metal or a metal oxide.

14. The process of claim 1, wherein the wet biomass feedstock is selected from the group consisting of high-moisture biomass slurries, biosludge from wastewater treatment systems, sewage sludge from municipal treatment systems, wet byproducts from biorefinery operations, wet byproducts/residues from food processing, animal waste and waste from centralized animal raising facilities, organic chemical manufacturing wastewater streams, industrial wastewater contaminated with organics, and combinations thereof.

15. The process of claim 1, wherein the exposing the wet biomass feedstock to a heterogeneous catalyst comprises processing the wet feedstock in a catalytic reactor at temperatures ranging from 250° C. to below the critical temperature of water.

16. The process of claim 1, wherein the exposing the wet biomass feedstock to a heterogeneous catalyst comprises processing the wet feedstock in a catalytic reactor at pressures below the critical pressure of water.

17. The process of claim 1, wherein the exposing occurs at 340-360° C. and 18-21 MPa.

18. The process of claim 1, wherein said gasifying of the organic constituents yields a methane-containing feedstock for catalytic reformation.

19. A catalytic hydrothermal process for treating a wet biomass feedstock comprising biomass, inorganic contaminants, soluble sulfate contaminants, and sub-critical liquid water, the process operated at temperatures and pressures that maintain the wet biomass feedstock in liquid phase without forming a supercritical fluid and characterized by:
- adding a salt comprising a calcium cation to the feedstock;
- heating under pressure the wet biomass feedstock to a pre-treatment temperature, which is at least 300° C. and sufficient for organic constituents in the feedstock to decompose, for precipitates of inorganic wastes to form, and for preheating the wet feedstock in preparation for removal of the soluble sulfate contaminants;
- reacting the soluble sulfate contaminants with calcium cations from the salt to yield a sulfate-containing precipitate;
- separating the precipitates of inorganic wastes and the sulfate-containing precipitates out the wet biomass feedstock to yield a liquid of the wet biomass feedstock having a decreased sulfate content; and
- exposing the liquid of the wet biomass feedstock to a heterogeneous metal catalyst and gasifying at least a portion of the organic constituents after said separating.

20. The process of claim 19, wherein the salt is substantially soluble at temperatures below the pre-treatment temperature.

* * * * *